(12) United States Patent
Vo et al.

(10) Patent No.: US 6,500,020 B2
(45) Date of Patent: Dec. 31, 2002

(54) TOP LOADING CUSTOMER BRIDGE

(75) Inventors: Chanh C. Vo, Arlington; Steven E. Glenn, Euless; Alicia D. Hothem, Haltham City; Boyd G. Brower, Keller; Brad N. Grunwald, Euless; John J. Napiorkowski, Irving, all of TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/885,196

(22) Filed: Jun. 20, 2001

(65) Prior Publication Data

US 2001/0053625 A1 Dec. 20, 2001

Related U.S. Application Data

(60) Provisional application No. 60/213,085, filed on Jun. 20, 2000.

(51) Int. Cl.[7] .................................................. H01R 4/24
(52) U.S. Cl. ...................................... 439/409; 439/133
(58) Field of Search ............................... 439/409, 417, 439/410, 395, 835, 716, 717, 718, 715, 266, 832, 135–145, 489, 892, 488, 491, 521, 133, 131; 379/442

(56) References Cited

U.S. PATENT DOCUMENTS

| | | | | |
|---|---|---|---|---|
| 3,611,264 A | | 10/1971 | Ellis, Jr. ................... 339/99 R |
| 4,340,270 A | * | 7/1982 | Wilmes et al. .............. 439/409 |
| 4,701,138 A | * | 10/1987 | Key ........................... 439/417 |
| 4,945,559 A | * | 7/1990 | Collins et al. .............. 379/413 |
| 4,979,209 A | * | 12/1990 | Collins et al. .............. 379/442 |
| 5,153,911 A | * | 10/1992 | Smith ......................... 379/412 |
| 5,291,553 A | * | 3/1994 | Smith ......................... 379/412 |
| 5,497,416 A | * | 3/1996 | Butler, III et al. .......... 379/412 |
| 5,620,332 A | * | 4/1997 | Gerke et al. ................ 439/417 |
| 5,637,011 A | | 6/1997 | Meyerfoefer et al. ...... 439/97 P |
| 6,048,223 A | * | 4/2000 | Bechaz et al. .............. 439/417 |
| 6,113,421 A | | 9/2000 | Daoud ........................ 439/456 |
| 6,120,315 A | * | 9/2000 | Gaertner et al. ............ 439/395 |
| 6,152,759 A | | 11/2000 | Daoud et al. ............... 439/409 |
| 6,172,875 B1 | * | 1/2001 | Suzuki et al. ............... 361/729 |
| 6,176,747 B1 | * | 1/2001 | Rowe et al. ................ 439/721 |
| 6,249,580 B1 | | 6/2001 | Daoud ........................ 379/399 |
| 6,302,723 B1 | * | 10/2001 | Baum et al. ................ 439/412 |

FOREIGN PATENT DOCUMENTS

| | | | |
|---|---|---|---|
| DE | 19956750 A1 | 6/2000 | ............. H01R/4/24 |
| EP | 0419038 A1 | 3/1991 | ............. H01R/4/24 |
| GB | 2114824 A | 8/1983 | ............. H01R/4/24 |
| GB | 2196492 A | 4/1988 | ............. H01R/4/24 |

* cited by examiner

Primary Examiner—P. Austin Bradley
Assistant Examiner—Ross Gushi
(74) Attorney, Agent, or Firm—Christopher C. Dremann

(57) ABSTRACT

A customer bridge for a terminating device includes a base defining an interior cavity and a base cap attached to the base and substantially covering the cavity. At least a pair of wire insertion holes formed through the base cap extend into the cavity for receiving twisted-pair tip and ring wires. The customer bridge further includes at least a pair of corresponding insulation displacement contacts disposed within the cavity. An actuating arm pivots between a disconnected position wherein the twisted-pair tip and ring wires do not engage the corresponding pair of insulation displacement contacts and a connected position wherein the twisted-pair tip and ring wires engage the corresponding pair of insulation displacement contacts. The wire insertion holes are located on the top surface of the customer bridge to permit the twisted-pair tip and ring wires to be inserted from immediately above the terminating device.

44 Claims, 6 Drawing Sheets

TOP LOADING CUSTOMER BRIDGE

CROSS REFERENCE TO RELATED APPLICATIONS

This application claims the benefit of U.S. Provisional Application No. 60/213,085 filed Jun. 20, 2000, entitled IDC Module and Cover.

BACKGROUND OF THE INVENTION

1. Field of the Invention

The present invention relates generally to a customer bridge for terminating subscriber wiring in a communications network. More specifically, the invention is a customer bridge having wire insertion holes located on the top surface to permit the subscriber wiring to be inserted from immediately above a terminating device.

2. Background of the Invention

A communications service provider, such as a telephone company, may offer both voice and data transmission services over a communications network. Customers of the service provider, commonly referred to as "subscribers," may purchase as many communications services as they desire and equip their homes, businesses, or the like with equipment to utilize such services. Subscribers are responsible for proper operation of the equipment and the service provider is responsible for proper operation of the communications network up to the interface, commonly referred to as the "demarcation point," between the service provider wiring and the subscriber wiring. The demarcation point is accessible to both the subscriber and the service provider and is typically located at the subscriber site in a network interface device (NID) or building entrance terminal (BET) mounted on the exterior wall of an office, apartment, commercial, or residential building, a home, or the like.

The NID or BET houses at least one, and typically, a plurality of wire terminating devices for interconnecting the service provider wiring with the subscriber wiring. As used herein, "terminating device" is intended to include any type of connector for interconnecting service provider wiring with subscriber wiring, configured with or without a protection element for protecting against a voltage and/or current surge, including but not limited to a line module, a protected terminating device (PTD), or the like. The terminating device includes one or more pairs of termination sites for the service provider wiring and one or more pairs of termination sites for the subscriber wiring. The terminating device typically further includes some type of electrical circuitry (e.g., half-ringer or printed circuit board) and/or electrical component (e.g., metal oxide varistor MOV) or gas tube) interconnected between the service provider wiring and the subscriber wiring. The termination sites for the service provider wiring are typically provided adjacent one end of the terminating device beneath a locked cover that is accessible only to service provider personnel. The termination sites for the subscriber wiring are typically provided adjacent the other end of the terminating device and are accessible to both the service provider personnel and the subscriber. The NID or BET may be further provided with an outer cover that is accessible to both service provider personnel and the subscriber, but is not accessible to unauthorized persons.

The NID or BET may be exposed to dust, moisture and other deleterious environmental effects. Accordingly, it is desirable to seal the termination sites to protect the terminating device from failure. When a terminating device fails, the subscriber is no longer able to access the communications network. Further, the service provider must dispatch a technician to the subscriber site to repair or replace the terminating device, at significant expense to the service provider. Terminating devices are available that utilize insulation displacement contacts and wire insertion holes on the side or the rear that may be sealed with a viscous, non-porous gel to protect the wire terminations, electrical circuitry and electrical components within the terminating device. However, the terminating devices are typically positioned too close together in the NID or BET to permit the subscriber wiring to be inserted from the side or the rear. The only available access in many existing NIDs or BETs for insertion of the subscriber wiring is from immediately above the terminating device. If the wire insertion holes for the subscriber wiring are located on the top surface of the terminating device, the space available for the conventional stuffer and screw mechanism that forces the subscriber wiring into engagement with the insulation displacement contacts is likewise limited. Furthermore, in many instances the portion of the terminating device that houses the subscriber termination sites, referred to herein as the customer bridge, must be removable from the terminating device to permit repair or replacement.

SUMMARY OF THE INVENTION

The present invention is a customer bridge having wire insertion holes located on the top surface. The location of the wire insertion holes permits subscriber wiring to be loaded from immediately above a terminating device, such as a line module or PTD.

In one embodiment, the invention is a customer bridge including a base defining an interior cavity and a base cap attached to the base and substantially covering the cavity. At least one wire insertion hole is formed through the base cap and extends into the cavity for receiving a conductive wire therein. At least one conductive contact is disposed within the cavity and connecting means are provided for establishing an electrical connection between the conductive wire and the conductive contact. The connecting means preferably includes an actuating arm having a first portion and a second portion pivotally attached to the first portion. The actuating arm is movable between a disconnected position wherein the conductive wire does not engage the conductive contact and a connected position wherein the conductive wire engages the conductive contact. The second portion engages and moves the conductive wire between the disconnected position and the connected position when the first portion is pivoted relative to the second portion.

In another embodiment, the invention is a customer bridge for a sealed terminating device. The customer bridge includes a base defining a cavity and a base cap attached to and substantially covering the cavity. The base cap includes a top surface having at least one wire insertion hole formed therethrough for receiving a conductive wire. At least one conductive contact is disposed within the cavity. At least one actuating arm is provided for establishing an electrical connection between the conductive wire and the conductive contact. The actuating arm is movable between a disconnected position wherein the conductive wire does not engage the conductive contact and a connected position wherein the conductive wire engages the conductive contact. As previously described, the actuating arm preferably includes a first portion and a second portion pivotally attached to the first portion. The second portion engages and moves the conductive wire between the disconnected position and the connected position when the first portion is pivoted relative to the second portion. The second portion has an opening formed therein for receiving the conductive wire. The opening is aligned with the wire insertion hole when the actuating arm is in the disconnected position and the opening is not aligned with the wire insertion hole when the actuating arm is in the connected position.

In yet another embodiment, the invention is a terminating device including a removable customer bridge. The customer bridge includes a base defining a cavity and a base cap attached to and substantially covering the cavity. The base cap includes a top surface having at least one hole formed therethrough for permitting insertion of at least one conductive wire from immediately above the terminating device. At least one corresponding conductive contact is disposed within the cavity. At least one actuating arm is provided for establishing an electrical connection between the conductive wire and the conductive contact. The actuating arm is movable between a disconnected position wherein the conductive wire does not engage the conductive contact and a connected position wherein the conductive wire engages the conductive contact. The at least one conductive wire is preferably twisted pair tip and ring wires and the at least one conductive contact is preferably a pair of corresponding insulation displacement contacts having a pair of opposed, sharp edges for engaging the twisted pair tip and ring wires.

As previously described, the actuating arm preferably includes a first portion and a second portion pivotally attached to the first portion. The second portion engages and moves the conductive wire between the disconnected position and the connected position when the first portion is pivoted relative to the second portion. A dielectric sealant may also be disposed within the cavity defined by the base for sealing the wire insertion hole and a cover may be hingedly attached to the base cap. The cover is movable between an opened position wherein the wire insertion hole is accessible to receive the conductive wire therein and a closed position wherein the wire insertion hole is not accessible to receive the conductive wire therein. Preferably, the cover has at least one slot formed therethrough for indicating the position of the at least one actuating arm.

BRIEF DESCRIPTION OF THE DRAWINGS

The accompanying drawings, which are incorporated in and constitute a part of this specification, illustrate one or more embodiments of the invention described more fully below and together with the following detailed description, serve to further explain the invention. In the drawings.

DETAILED DESCRIPTION OF VARIOUS EMBODIMENTS OF THE INVENTION

FIGS. 1–5 illustrate a customer bridge, indicated generally at 20, constructed in accordance with the invention. Customer bridge 20 is sometimes referred to in the art as an interconnect module, a connector module, or a wiring module. As used herein, the term "customer bridge" is intended to include any apparatus for terminating wiring in a communications network, including but not limited to an interconnect module, a connector module, a wiring module, or a customer bridge. In the exemplary embodiments illustrated and described herein, the customer bridge 20 is used to terminate subscriber wiring in a terminating device, such as a line module, PTD, or the like, that is housed in a conventional NID or BET in a telecommunications network.

Figure 4:
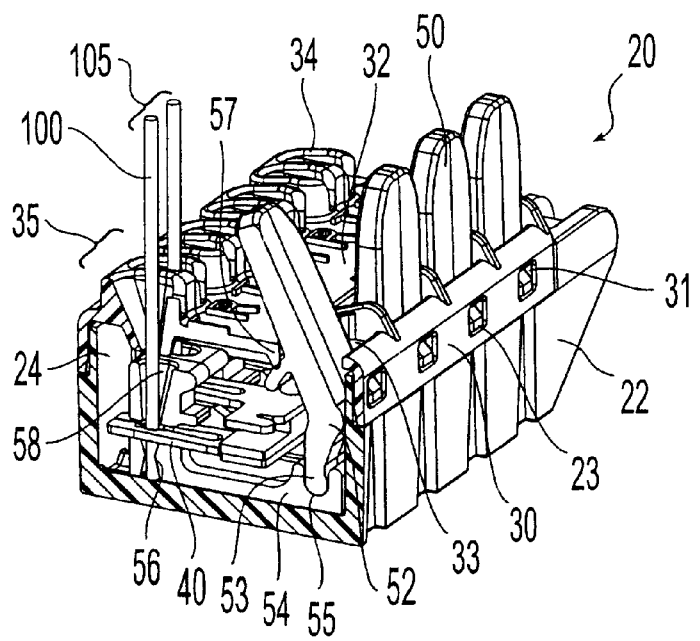
FIG. 4 is a sectioned perspective view taken along line 4—4 of FIG. 2 showing the customer bridge with subscriber wiring inserted at one of the line stations and with the corresponding actuating arm in a first, disconnected position.
Figure 5:
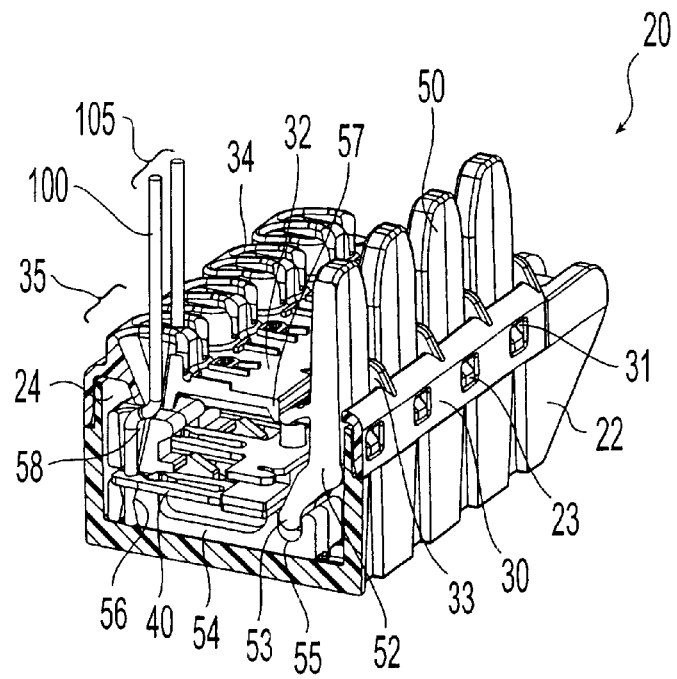
FIG. 5 is a sectioned perspective view taken along the line 5—5 of FIG. 2 showing the customer bridge with subscriber wiring inserted at one of the line stations and with the corresponding actuating arm in a second, connected position.

The customer bridge 20 comprises a base 22 and a base cap 30 attached to the base. The base 22 is generally hollow and defines an interior cavity 24 (FIGS. 4 and 5). The base cap 30 is attached to the upper edge of the base 22 such that the base cap substantially covers, and thereby encloses, the cavity 24. The base cap 30, for example, may be provided with apertures 31 that cooperate in a conventional manner with projecting tabs 23 formed on base 22 to secure the base cap onto the base. However, the base cap may be secured to the base in any manner that facilitates manufacture and assembly of the customer bridge 20. The base 22 further comprises a hinge 26 for receiving a removable cover 60 (FIG. 1) and a mounting tab 28 (FIG. 1) for removably mounting the customer bridge 20 on a terminating device, such as a line module 110 (FIG. 11) or PTD 120 (FIG. 12), as will be described in greater detail hereinafter. The customer bridge 20 described and illustrated herein may be used in either an indoor or an outdoor application. However, the customer bridge 20 is particularly useful in outdoor applications where the NID or BET is subjected to vibration, shock, or deleterious environmental effects. Accordingly, the cavity 24 defined by the base 22 may be filled with a dielectric sealant, such as a grease or a viscous gel, to protect the components housed within the base from excessive vibration, shock or exposure to environmental effects, such as moisture from rain or melting snow.

The base cap 30 comprises a top surface 32 (FIG. 2) opposite the cavity 24 defined by the base 22. The top surface 32 has at least one wire insertion hole 34 formed therethrough and extending into the cavity 24. The wire insertion hole 34 is sized to receive a conductive wire 100 therein. Preferably, the conductive wire 100 has a thickness of between about 18 and about 24 AWG. Most preferably, however, the conductive wire has a thickness of between about 22 and about 24 AWG. In the exemplary embodiments illustrated and described herein, the conductive wire 100 is a subscriber wire in a telecommunications network. As shown herein, the wire insertion hole 34 comprises at least a pair of wire insertion holes 35 for receiving twisted pair tip and ring wires 105 from a subscriber's communications equipment, such as a conventional telephone handset (not shown). Preferably, the base cap 30 of the customer bridge 20 has a plurality of pairs of wire insertion holes 35 for receiving a corresponding plurality of twisted pair tip and ring wires 105 to interconnect various subscriber equipment with a communications (i.e., telephone) line from a service provider, such as a telephone company. As shown, the base cap 30 has four pairs of wire insertion holes 35 for receiving up to four twisted pair tip and ring wires 105 that interconnect the subscriber wiring with the service provider wiring to establish service over a communications network.

The customer bridge 20 further comprises at least one conductive contact 40 (FIGS. 4 and 5) disposed within the cavity 24 defined by the base 22. The conductive contact 40 is electrically connected to a lead wire (not shown) extending from, for example, a jack on the terminating device in a known manner. Accordingly, when a conductive wire 100 inserted in the wire insertion hole 34 engages the conductive contact 40, as will be described, the conductive wire is electrically connected to the lead wire. Similarly, a conductive wire from the service provider is electrically connected to a lead wire extending from the jack. Preferably, the jack comprises a subscriber conductor electrically connected to the lead wire connected to the conductive wire 100 from the subscriber and a service provider conductor electrically connected to the lead wire connected to the conductive wire from the service provider. In this manner, the subscriber wiring may be selectively interconnected with the service provider wiring through the jack in a known manner. As previously described, one or more twisted pair tip and ring wires 105 are interconnected with the twisted pair tip and ring wires of a communications (i.e., telephone) line from a service provider. The conductive contact may be any suitable contact for establishing an electrical connection with the subscriber wiring. Preferably, however, the conductive contact 40 is an insulation displacement contact having opposed, sharp edges for piercing the insulation surrounding the conductive wire 100, thereby establishing electrical continuity between the conductive wire 100 and the conductive contact 40.

The customer bridge 20 further comprises at least one actuating arm 50 for forcing the conductive wire 100 into engagement with the conductive contact 40. The actuating arm 50 is disposed partially within the cavity 24 defined by the base 22 and partially above the top surface 32 of the base cap 30. As shown herein, the top surface 32 of the base cap 30 further has at least one opening 33 formed therethrough for receiving the actuating arm 50 therein. However, the actuating arm 50 may extend upwardly through the base 22 or the base cap 30 may have a cavity or an elongated slot formed therein to permit the actuating arm to extend upwardly from the cavity 24 defined by the base 22 to above the top surface 32. Regardless, the actuating arm 50 is accessible from immediately above the top surface 32 of the base cap 30. Preferably, the a least one actuating arm 50 comprises a plurality of actuating arms corresponding to the plurality of pairs of wire insertion holes 35, twisted pair tip and ring wires 105, and pairs of conductive contacts 40. As shown herein, four actuating arms 50 are provided, each corresponding to one of the four pairs of wire insertion holes 35 that receive twisted pair tip and ring wires 105.

Figure 2:
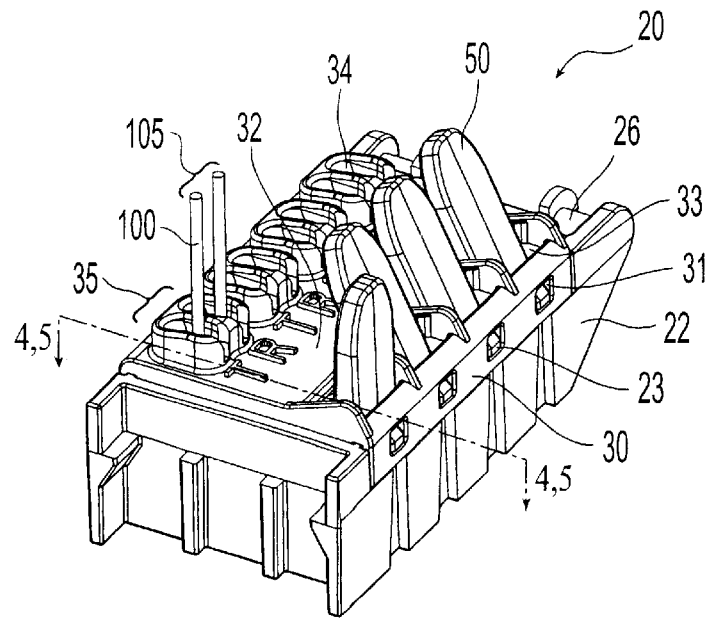
FIG. 2 is a perspective view of the customer bridge of FIG. 1 shown with the hinged cover removed for purposes of clarity.
Figure 3:
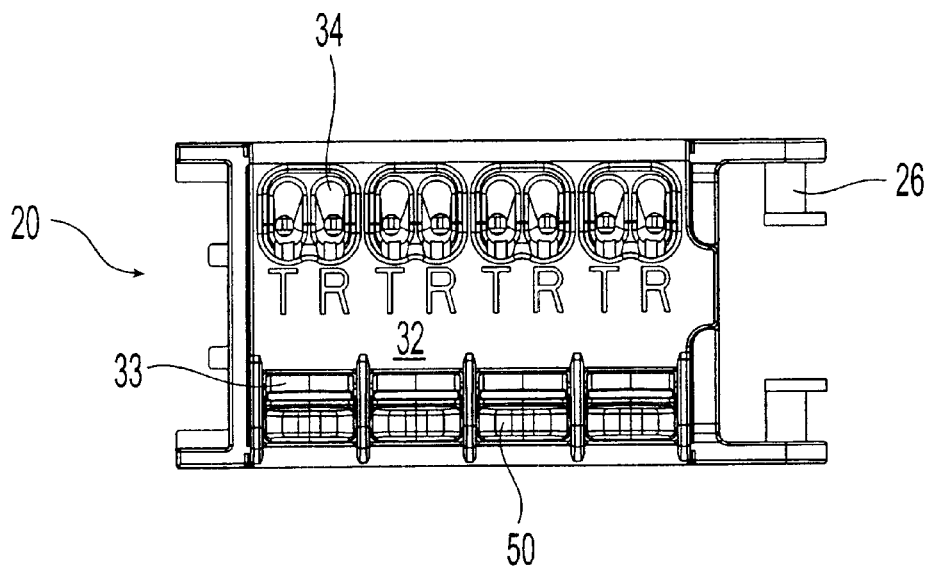
FIG. 3 is a top plan view of the customer bridge of FIG. 2.

The actuating arm 50 comprises a first portion 52 and a second portion 54 pivotally attached to the first portion. The actuating arm 50 is movable between a first, disconnected position in which the conductive wire 100 does not engage the conductive contact 40 and a second, connected position in which the conductive wire 100 engages the conductive contact 40. In FIG. 2, three of the actuating arms 50 are shown in the disconnected position and one of the actuating arms is shown in the connected position. As shown and described here, the conductive contact 40 is disposed horizontally and fixed relative to base 22 and the actuating arm 50 is configured to force the conductive wire 100 between the opposed, sharp edges of the insulation displacement contact. Alternatively, the conductive wire 100 could be fixed relative to base 22 and the actuating arm 50 could be configured to force the conductive contact 40 into engagement with the conductive wire 100.

As best shown in FIGS. 4 and 5, the second portion 54 of the actuating arm 50 is provided with a cam surface 55 that cooperates with a pivot 53 formed at the base of the first portion 52. When actuating arm 50 is moved from the disconnected position (FIG. 4) to the connected position (FIG. 5), pivot 53 of first portion 52 engages cam surface 55 of second portion 54 to drive the second portion in the direction of the conductive wire 100. In the configuration shown, rotation of first portion 52 from the disconnected position to the connected position drives second portion 54 horizontally parallel to the conductive contact 40 disposed within the base 22 such that stop 56 formed on the end of second portion 54 forces the conductive wire 100 between the opposed, sharp edges of the insulation displacement contact. If the end of the conductive wire 100 has an insulative coating, the sharp edges of the insulation displacement contact pierce the insulation and establish electrical continuity between the conductive wire and the conductive contact 40. As will be apparent to one of ordinary skill in the art, the second portion 54 of the actuating arm 50 corresponds to the stuffer and the first portion 52 of the actuating arm 50 corresponds to the screw of a conventional insulation displacement contact assembly. Preferably, the base cap 30 (and/or the base 22) is provided with one or more detents 57 (one shown) for positively retaining the first portion 52 of the actuating arm 50 in the disconnected position and/or the connected position.

The second portion 54 of the actuating arm 50 has an opening 58 formed therethrough opposite the wire insertion hole 34 for likewise receiving the conductive wire 100 therein. The opening 58 has a generally frusto-conical shape with a larger diameter adjacent the base cap 30 and a smaller diameter adjacent the conductive contact 40. As the actuating arm 50 moves from the disconnected position to the connected position, the conductive wire 100 is crimped above the conductive contact 40 and immediately below the base cap 30. As best shown in FIG. 5, the conductive wire 100 is thereby securely retained within the base 22 of the customer bridge 20 when the actuating arm 50 is in the connected position. This retention feature also prevents inadvertent insertion of a conductive wire 100 when the actuating arm 50 is already in the connected position. Otherwise, insertion of a conductive wire 100 into the wire insertion hole 34 with the actuating arm 50 already in the connected position could result in a temporary electrical connection being established between the conductive wire 100 and the conductive contact 40 that is lost if a pulling force is subsequently applied to the conductive wire.

Figure 6:
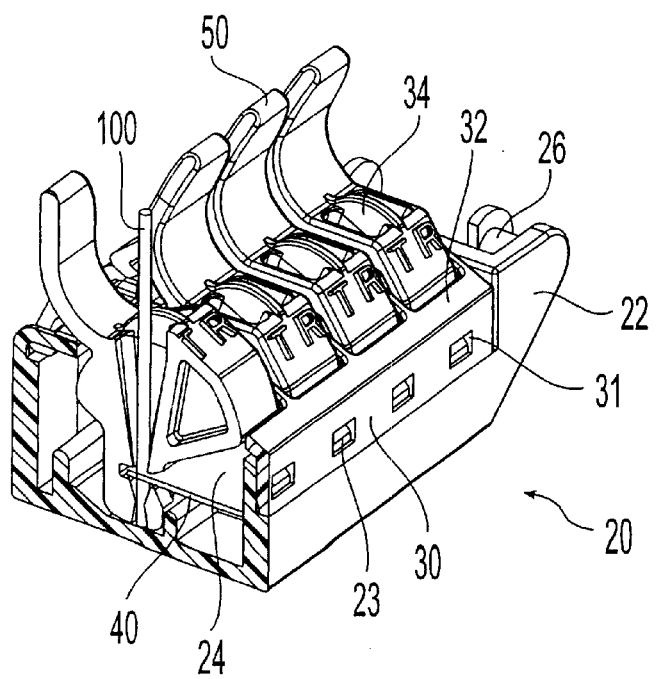
FIG. 6 is a sectioned perspective view of another embodiment of a customer bridge constructed in accordance with the invention shown with subscriber wiring inserted at one of the line stations and with the corresponding actuating arm in the connected position.
Figure 7:
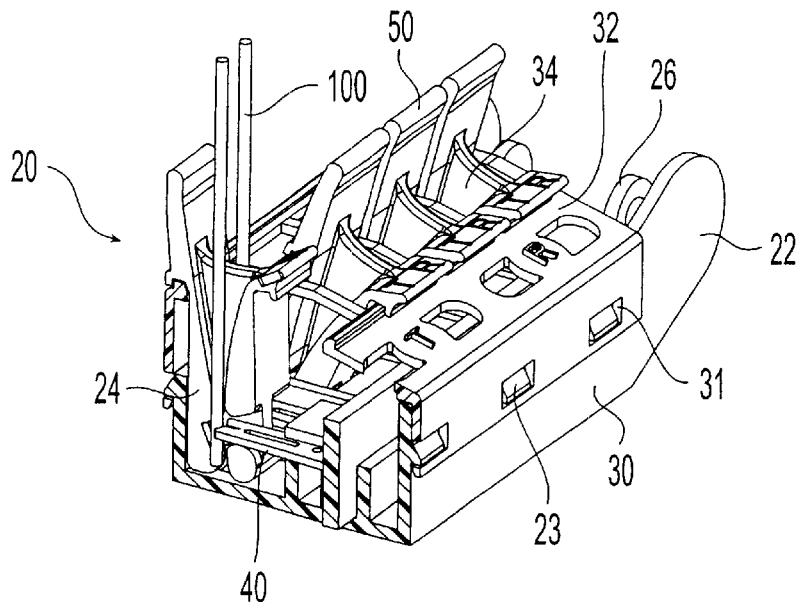
FIG. 7 is a sectioned perspective view of yet another embodiment of a customer bridge constructed in accordance with the invention shown with subscriber wiring inserted at one of the line stations and the corresponding actuating arm in the disconnected position.

The embodiment of the customer bridge 20 illustrated in FIGS. 1–5 is termed a "switch IDC" because the actuating arm 50 is in the form of a switch mechanism and the conductive contact 40 is an insulation displacement contact. FIG. 6 illustrates another embodiment of the customer bridge 20 that is termed a "rocker IDC" because the actuating arm 50 is in the form of a rocker mechanism and the conductive contact 40 is an insulation displacement contact. FIG. 7 illustrates another embodiment of the customer bridge 20 that is termed a "lever IDC" because the actuating arm 50 is in the form of a lever mechanism and the conductive contact 40 is an insulation displacement contact. Like reference numerals are utilized to indicate like or common parts in the various figures. As in FIG. 2, one of the actuating arms 50 in FIG. 6 is shown in the connected position and the remaining three are shown in the disconnected position. As in FIG. 4, one of the actuating arms 50 in FIG. 7 is shown in the disconnected position and the remaining three are shown in the connected position. Regardless, when the actuating arm 50 is moved from the disconnected position to the connected position, the conductive wire 100 is forced into engagement with the opposed, sharp edges of the insulation displacement contact 40. A particular advantage of the "switch IDC" embodiment of the customer bridge 20 over the "rocker IDC" and the "lever IDC" embodiments is that the wire insertion holes 34 are separated from the actuating arm 50. Accordingly, there is additional working space available for a craftsperson to manipulate the actuating arm when inserting the twisted pair tip and ring wires. Furthermore, the area between the wire insertion holes 34 and the actuating arms 50 on the "switch IDC" is available for routing and dressing the twisted pair tip and ring wires when the customer bridge 20 is installed in a terminating device.

Figure 1:
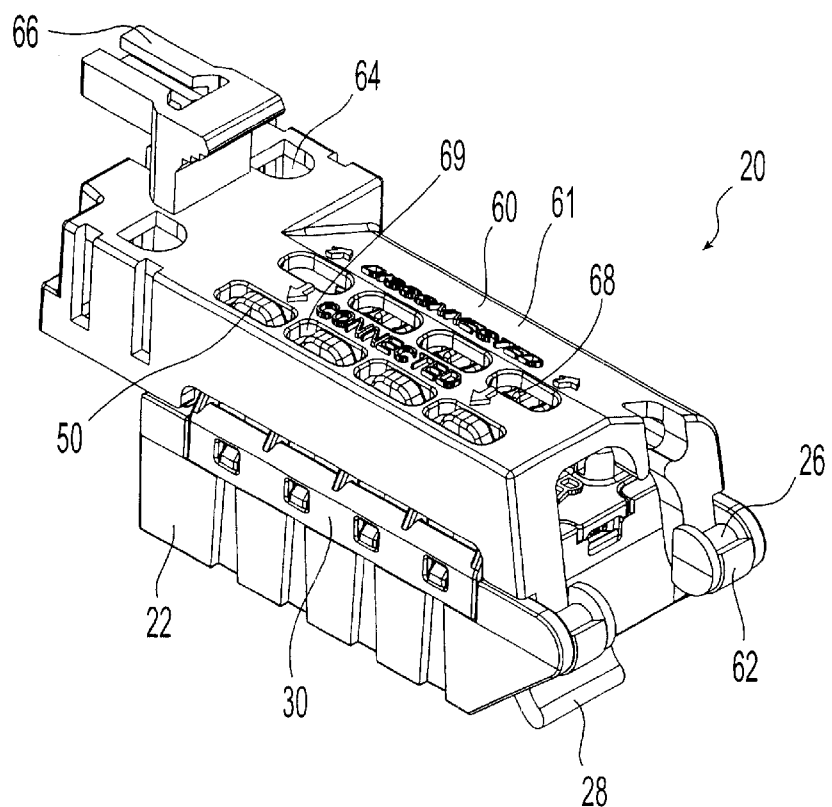
FIG. 1 is a perspective view of a customer bridge constructed in accordance with the invention.

The customer bridge 20 may further comprise a cover 60 that is movable between a first, opened position and a second, closed position. The cover 60 has a pair of hinge arms 62 that cooperate with the hinge 26 provided on the base 22. Thus, the cover 60 is rotatable between the opened and the closed positions, or may be completely removed from the base 22 to provide increased access to the wire insertion holes 34 and the actuating arms 50 on the top surface 32 of the base cap 30. As shown, the cover 60 further has a pair of conventional test ports 64 for receiving test contacts for verifying the integrity of the connection between the conductive wires and the conductive contacts. The cover 60 may further comprise a locking slide 66 for preventing unauthorized persons from gaining access to the wire insertion holes 34 and the actuating arms 50 of the customer bridge 20. The locking slide 66 is described in greater detail in a co-pending application assigned to the assignee of the present application entitled Sealed PTD. As shown in FIG. 1, the cover 60 has a plurality of first slots 68 corresponding to the plurality of actuating arms 50 for indicating when the actuating arm is in the disconnected position. The cover 60 further has a plurality of second slots 69 corresponding to the plurality of first slots 68 and the plurality of actuating arms 50 for indicating when the actuating arm is in the connected position. Printed indicia 61 may also be provided on the top surface of the cover 60 adjacent the first slots 68 and the second slots 69 to clarify the positions of the actuating arms 50.

Figure 8:
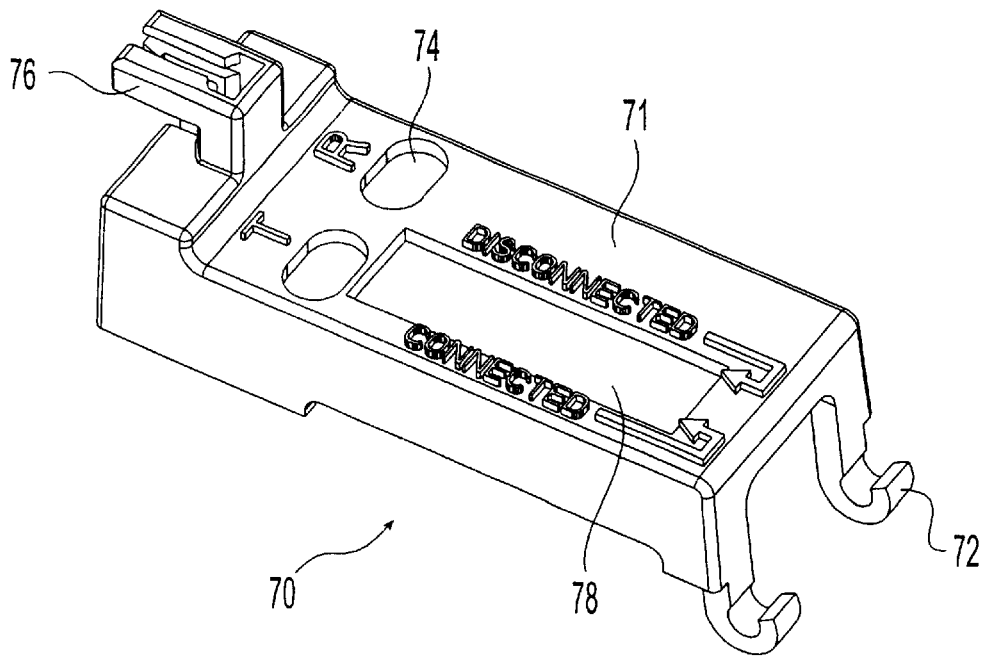
FIG. 8 is a perspective view of a first alternative embodiment of a cover for a customer bridge constructed in accordance with the invention.
Figure 9:
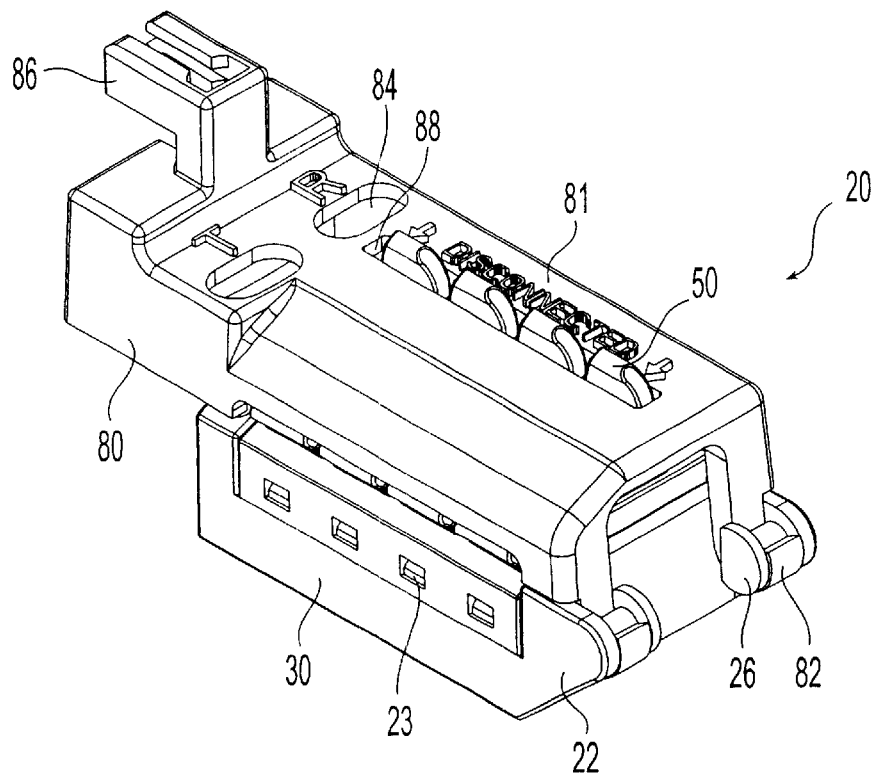
FIG. 9 is a perspective view of a second alternative embodiment of a cover for a customer bridge constructed in accordance with the invention.
Figure 10:
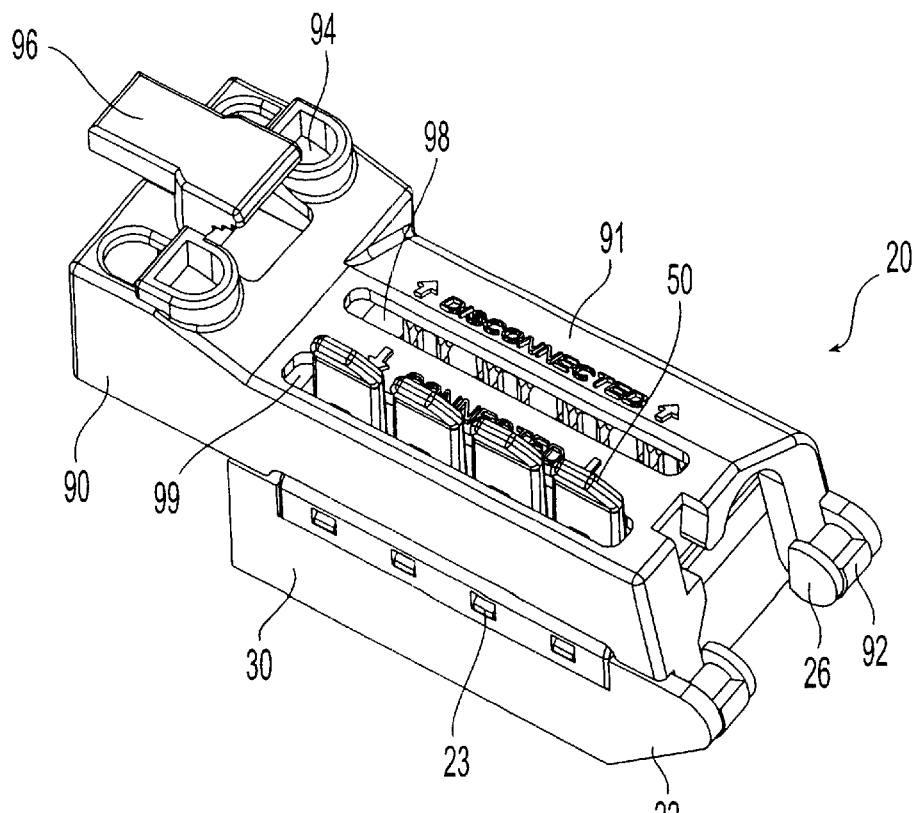
FIG. 10 is a perspective view of a third alternative embodiment of a cover for a customer bridge constructed in accordance with the invention.

FIG. 8 illustrates a first alternative embodiment of a cover 70 for a customer bridge constructed in accordance with the invention. The cover 70 is similar to the cover 60 shown in FIG. 1 except that the test ports 74 are located adjacent a single elongated slot 78. Slot 78 takes the place of first slots 68 and second slots 69 of cover 60 and functions similarly to indicate whether the actuating arms 50 are in the disconnected or the connected position. Printed indicia 71 may likewise be provided to clarify the position of the actuating arms. FIG. 9 illustrates a second alternative embodiment of a cover 80 for a customer bridge constructed in accordance with the invention. The cover 80 is similar to the cover 60 shown in FIG. 1 except that the test ports 84 are located adjacent a single elongated slot 88. Slot 88 takes the place of first slots 68 or second slots 69 of cover 60 and functions similarly to indicate whether the actuating arms 50 are in the disconnected or the connected position. Printed indicia 81 may likewise be provided to clarify the position of the actuating arms. As shown, the printed indicia 81 and the slot 88 indicate when an actuating arm 50 is in the disconnected position. Alternatively, printed indicia 81 and slot 88 may be configured to indicate when an actuating arm 50 is in the connected position. FIG. 10 illustrates a third alternative embodiment of a cover 90 for a customer bridge constructed in accordance with the invention. The cover 90 is similar to the cover 60 shown in FIG. 1 except that a pair of elongated, continuous slots 98, 99 are formed in the cover. Slots 98, 99 take the place of first slots 68 and second slots 69 of cover 60 and function similarly to indicate whether the actuating arms 50 are in the disconnected or the connected position. Printed indicia 91 may likewise be provided to clarify the position of the actuating arms.

Figure 11:
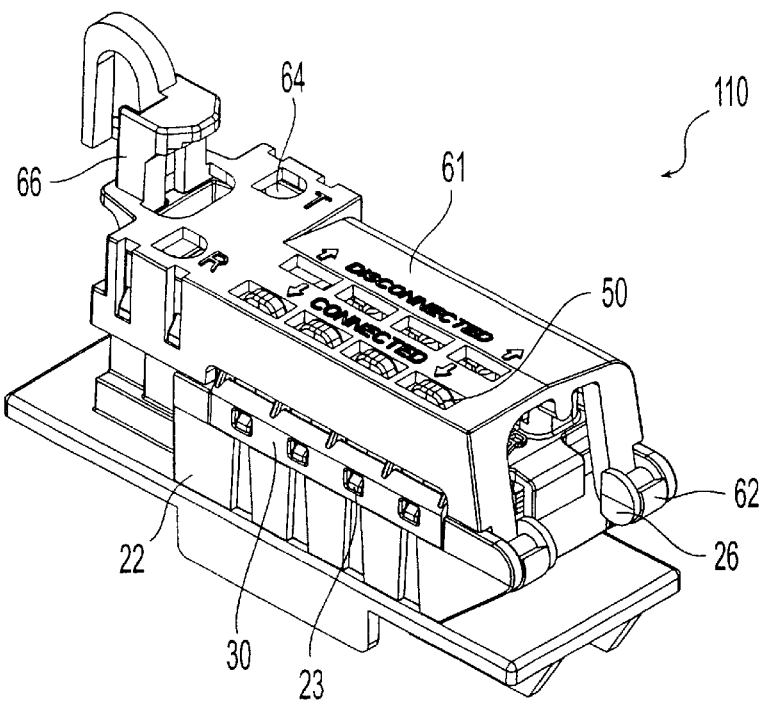
FIG. 11 is a perspective view of a customer bridge constructed in accordance with the invention removably mounted on a conventional telephone line module.
Figure 12:
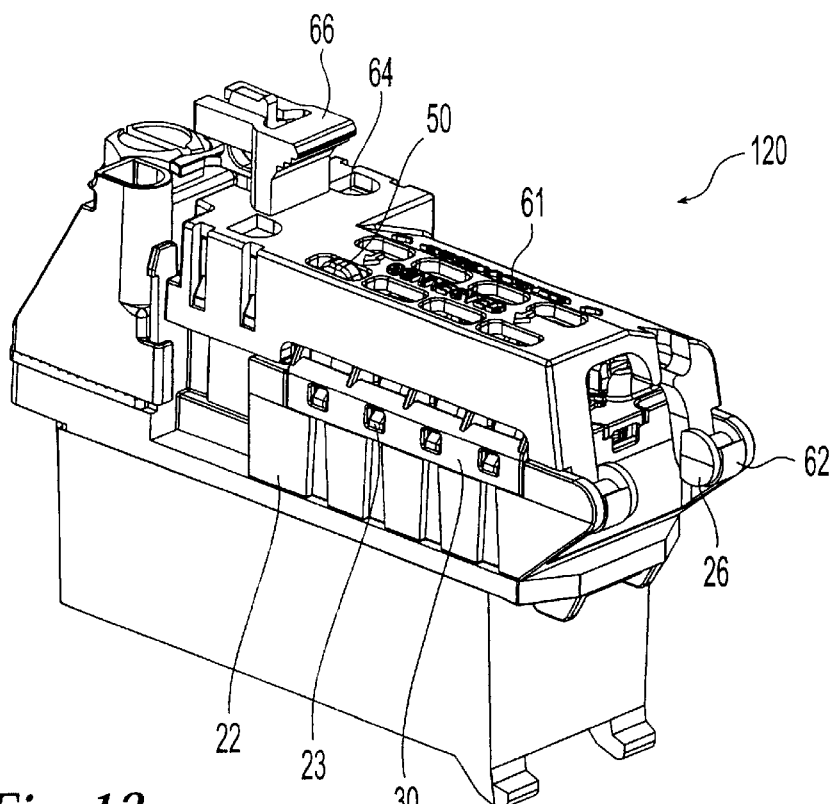
FIG. 12 is a perspective view of a customer bridge constructed in accordance with the invention removably mounted on a conventional telephone PTD.

As illustrated in FIGS. 11 and 12, the customer bridge 20 may be removably mounted to any terminating device, such as a conventional telephone line module 110 or a PTD 120, respectively. The line module 110 typically comprises some type of electronic circuitry, such as a half-ringer or printed circuit board, interconnected between the service provider wiring and the subscriber wiring. A plurality of the line modules 110 are typically housed in side-by-side relation within a NID or BET having separate protection elements. The customer bridge 20 is secured to the line module 110 by the mounting tab 28 provided on the underside of the base 22. When the line module 110 is housed within the NID or BET, the cover 60 of the customer bridge 20 may rotated from the closed position (as shown) to the opened position, or may be completely removed to provide access to the wire insertions holes 34 and the actuating arms 50. Furthermore, the test ports 64 may be utilized with the cover 60 in the closed position to verify the integrity of the connections between the conductive wires 100 and the conductive contacts 40. The PTD 120 comprises service provider termination sites 122 for terminating the service provider wiring. The PTD 120 typically further comprises some type of protection element, such as a gas tube or MOV, interconnected between the service provider wiring and the subscriber wiring. The gas tube or MOV may be provided in place of or in addition to electronic circuitry, such as a half-ringer or printed circuit board. A plurality of the PTDs 120 are typically housed in side-by-side relation within a NID or BET. The customer bridge 20 is secured to the PTD 120 by the mounting tab 28 provided on the underside of the base 22. When the PTD 120 is housed within the NID or BET, the cover 60 of the customer bridge 20 may rotated from the closed position (as shown) to the opened position, or may be completely removed to provide access to the wire insertion holes 34 and the actuating arms 50. Furthermore, the test ports 64 may be utilized with the cover 60 in the closed position to verify the integrity of the connections between the conductive wires 100 and the conductive contacts 40.

While the invention has been shown in only one of its forms, it should be apparent to those skilled in the art that it is not so limited, but is susceptible to various changes without departing from the scope of invention. Accordingly, it is intended that the appended claims encompass any alternative embodiments of the invention not disclosed herein that are within the ordinary skill of a person knowledgeable in the art of electrical wiring modules and terminating devices.

What is claimed is:

1. A wire terminating module comprising:
   a base defining a cavity;
   a base cap attached to the base and substantially covering the cavity;
   at least one wire insertion hole formed through the base cap into the cavity, the wire insertion hole receiving a conductive wire therein;
   at least one conductive contact disposed within the cavity; and
   an actuating arm that is movable between a disconnected position in which the conductive wire does not engage the conductive contact and a connected position in which the conductive wire engages the conductive contact, the actuating arm having an opening formed therein for receiving the conductive wire such that the opening is aligned with the wire insertion hole when the actuating arm is in the disconnected position and the opening is not aligned with the wire insertion hole when the actuating arm is in the connected position.

2. A wire terminating module according to claim 1, wherein the base cap has a top surface adjacent the cavity and the wire insertion hole is formed through the top surface.

3. A wire terminating module according to claim 1, wherein the actuating arm is separated from the wire insertion hole on the base cap.

4. A wire terminating module according to claim 1, wherein the actuating arm comprises a first portion and a second portion pivotally attached to the first portion, the second portion engaging and moving the conductive wire between the disconnected position and the connected position when the first portion is pivoted relative to the second portion.

5. A wire terminating module according to claim 4, wherein the opening is formed in the second portion of the actuating arm.

6. A wire terminating module according to claim 1, wherein the conductive contact is an insulation displacement contact having a pair of opposed, sharp edges that engage the conductive wire in the connected position and wherein the insulation displacement contact is disposed within the cavity substantially parallel to the base cap.

7. A wire terminating module according to claim 1, further comprising a dielectric sealant disposed within the cavity defined by the base for sealing the wire insertion hole.

8. A wire terminating module according to claim 1, further comprising a cover hingedly attached to the base cap, the cover being movable between a closed position wherein the wire insertion hole is not accessible to receive the conductive wire therein and an opened position wherein the wire insertion hole is accessible to receive the conductive wire therein.

9. A wire terminating module according to claim 1, wherein the at least one wire insertion hole comprises a pair of wire insertion holes that receive twisted pair tip and ring wires therein and wherein the at least one conductive contact comprises a pair of corresponding insulation displacement contacts having opposed, sharp edges for receiving the twisted pair tip and ring wires.

10. A wire terminating module comprising:
    a base defining a cavity,
    a base cap attached to the base and substantially covering the cavity;
    at least one wire insertion hole formed through the base cap into the cavity for receiving a conductive wire;
    at least one conductive contact disposed within the cavity;
    at least one actuating arm for establishing a connection between the conductive wire and the conductive contact, the actuating arm movable between a disconnected position in which the conductive wire does not engage the conductive contact and a connected position in which the conductive wire engages the conductive contact; and
    a cover attached to the base cap and movable between a closed position and an opened position, the cover having at least one slot formed therethrough for indicating the position of the at least one actuating arm.

11. A wire terminating module according to claim 10, wherein the actuating arm is separated from the wire insertion hole on the base cap.

12. A wire terminating module according to claim 10, wherein the actuating arm comprises a first portion and a second portion pivotally attached to the first portion, the second portion engaging and moving the conductive wire between the disconnected position and the connected position when the first portion is pivoted relative to the second portion.

13. A wire terminating module according to claim 12, wherein the second portion has an opening formed therein for receiving the conductive wire such that the opening is aligned with the wire insertion hole when the actuating arm is in the disconnected position and the opening is not aligned with the wire insertion hole when the actuating arm is in the connected position.

14. A wire terminating module according to claim 10, wherein the conductive contact is an insulation displacement contact having a pair of opposed, sharp edges that engage the conductive wire in the connected position and wherein the insulation displacement contact is disposed within the cavity substantially parallel to the base cap.

15. A wire terminating module according to claim 10, further comprising a dielectric sealant disposed within the cavity defined by the base for sealing the wire insertion hole.

16. A wire terminating module according to claim 10, wherein the wire insertion hole is not accessible to receive the conductive wire therein in the closed position and wherein the wire insertion hole is accessible to receive the conductive wire therein in the opened position.

17. A wire terminating module according to claim 10, wherein the at least one slot comprises a first slot for indicating that the actuating arm is in the disconnected position and a second slot for indicating that the actuating arm is in the connected position.

18. A wire terminating module according to claim 10, wherein the cover comprises printed indicia adjacent the at least one slot for indicating the position of the at least one actuating arm.

19. A wire terminating module according to claim 10, wherein the at least one wire insertion hole comprises at least a pair of wire insertion holes for receiving twisted pair tip and ring wires and wherein the at least one conductive contact comprises at least a pair of insulation displacement contacts having opposed, sharp edges for receiving the twisted pair tip and ring wires.

20. A customer bridge for a terminating device, the customer bridge comprising:
  a base defining a cavity;
  a base cap attached to and substantially covering the cavity, the base cap having at least one wire insertion hole formed therethrough, the wire insertion hole receiving a conductive wire therein;
  at least one conductive contact disposed within the cavity; and
  at least one actuating arm for establishing a connection between the conductive wire and the conductive contact, the actuating arm movable between a disconnected position in which the conductive wire does not engage the conductive contact and a connected position in which the conductive wire engages the conductive contact, the actuating arm comprising a first portion and a second portion pivotally attached to the first portion, the second portion engaging and moving the conductive wire between the disconnected position and the connected position when the first portion is pivoted relative to the second portion, the second portion having an opening formed therein for receiving the conductive wire such that the opening is aligned with the wire insertion hole when the actuating arm is in the disconnected position and the opening is not aligned with the wire insertion hole when the actuating arm is in the connected position.

21. A customer bridge according to claim 20, wherein the actuating arm is separated from the wire insertion hole on the base cap.

22. A customer bridge according to claim 20, wherein the conductive contact is an insulation displacement contact having a pair of opposed, sharp edges that engage the conductive wire in the connected position and wherein the insulation displacement contact is disposed within the cavity substantially parallel to the base cap.

23. A customer bridge according to claim 20, further comprising a dielectric sealant disposed within the cavity defined by the base for sealing the wire insertion hole.

24. A customer bridge according to claim 20, further comprising a cover hingedly attached to the base cap, the cover movable between a closed position wherein the wire insertion hole is not accessible to receive the conductive wire therein and an opened position wherein the wire insertion hole is accessible to receive the conductive wire therein.

25. A customer bridge according to claim 24, wherein the cover has at least one slot formed therethrough for indicating the position of the at least one actuating arm.

26. A customer bridge according to claim 25, wherein the at least one slot comprises a first slot for indicating that the actuating arm is in the disconnected position and a second slot for indicating that the actuating arm is in the connected position.

27. A customer bridge according to claim 20, wherein the at least one wire insertion hole comprises at least one pair of wire insertion holes for receiving twisted pair tip and ring wires and wherein the at least one conductive contact comprises at least one pair of insulation displacement contacts having opposed, sharp edges for receiving the twisted pair tip and ring wires.

28. A connector module for terminating wiring comprising:
  a base defining a cavity;
  a base cap attached to and substantially covering the base, the base cap having at least one hole formed therethrough for receiving a conductive wire;
  at least one insulation displacement contact disposed within the cavity and having opposed sharp edges for receiving the conductive wire therebetween;
  at least one actuating arm movable between a disconnected position in which the conductive wire does not engage the insulation displacement contact and a connected position in which the conductive wire engages the insulation displacement contact; and
  a cover attached to the base cap and movable between a closed position and an opened position, the cover having at least one slot formed therethrough for indicating the position of the at least one actuating arm.

29. A connector module according to claim 28, wherein the actuating arm is separated from the wire insertion hole on the base cap.

30. A connector module according to claim 28, wherein the insulation displacement contact is disposed within the cavity substantially parallel to the base cap.

31. A connector module according to claim 28, further comprising a dielectric sealant disposed within the cavity defined by the base for sealing the hole in the top surface of the base cap.

32. A wiring module according to claim 28, wherein the at least one hole comprises at least a pair of holes for receiving twisted pair tip and ring wires and wherein the at least one insulation displacement contact comprises at least a pair of corresponding insulation displacement contacts.

33. A wiring module according to claim 28, wherein the hole is not accessible to receive the conductive wire therein in the closed position and wherein the hole is accessible to receive the conductive wire therein in the opened position.

34. A wiring module according to claim 28, wherein the at least one slot comprises a first slot for indicating that the actuating arm is in the disconnected position and a second slot for indicating that the actuating arm is in the connected position.

35. A wire terminating nodule comprising:
  a base defining a cavity,
  a base cap attached to the base and substantially covering the cavity,
  at least one wire insertion hole formed through the base cap into the cavity, the wire insertion hole receiving a conductive wire therein;
  at least one conductive contact disposed within the cavity;
  means for establishing a connection between the conductive wire and the conductive contact wherein the conductive wire is inserted into the cavity from above the base cap; and
  a cover attached to the base cap and movable between a closed position wherein the wire insertion hole is not accessible to receive the conductive wire therein and an opened position wherein the wire insertion hole is accessible to receive the conductive wire therein.

36. A wire terminating module according to claim 35, wherein the at least one conductive contact is disposed within the cavity substantially parallel to the base cap.

37. A wire terminating module according to claim 35, wherein the cover is hingedly attached to the base cap.

38. A wire terminating module according to claim 35, wherein the cover has at least one slot formed therethrough.

39. A wire terminating module according to claim 35, wherein the at least one wire insertion hole comprises at least a pair of wire insertion holes for receiving twisted pair tip and ring wires and wherein the at least one conductive contact comprises at least a pair of corresponding insulation displacement contacts.

40. A customer bridge for a terminating device, the customer bridge comprising:

a base defining a cavity;

a base cap attached to the base and substantially covering the cavity the base cap having at least one wire insertion hole formed therethrough, the wire insertion hole receiving a conductive wire therein;

at least one conductive contact disposed within the cavity; and a cover attached to the base cap and movable between a closed position wherein the wire insertion hole is not accessible to receive the conductive wire therein and an opened position wherein the wire insertion hole is accessible to receive the conductive wire therein, wherein the conductive wire is inserted into the cavity through the at least one wire insertion hole formed in the base cap.

41. A customer bridge according to claim 40, wherein the at least one conductive contact is disposed within the cavity substantially parallel to the base cap.

42. A customer bridge according to claim 40, wherein the cover is hingedly attached to the base cap.

43. A customer bridge according to claim 40, wherein the cover has at least one slot formed therethrough.

44. A customer bridge according to claim 40, wherein the at least one wire insertion hole comprises at least a pair of wire insertion holes for receiving twisted pair tip and ring wires and wherein the at least one conductive contact comprises at least a pair of corresponding insulation displacement contacts.

* * * * *